May 17, 1938. M. S. CURTIS 2,118,022
MACHINE TOOL
Original Filed Feb. 9, 1931 7 Sheets-Sheet 4

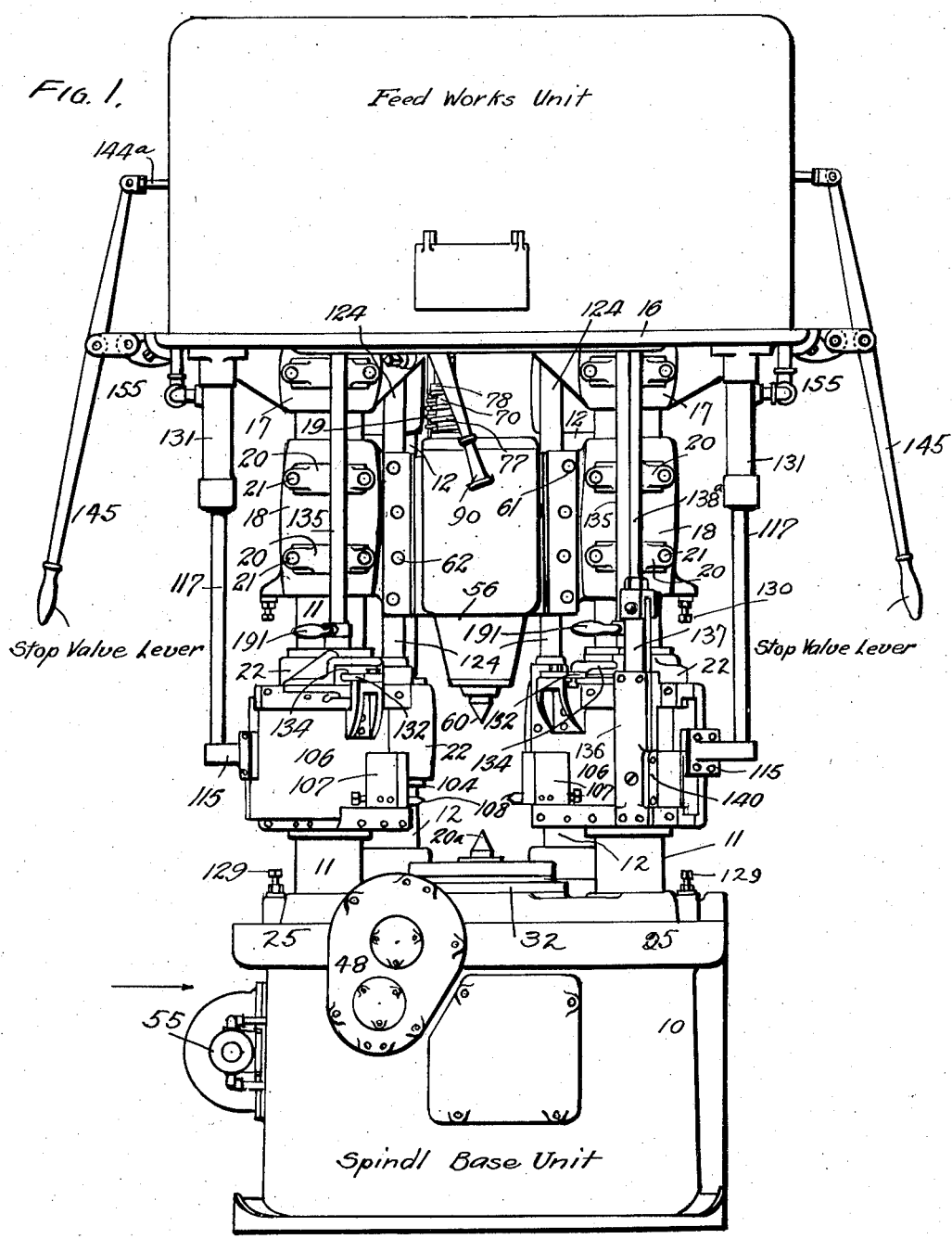

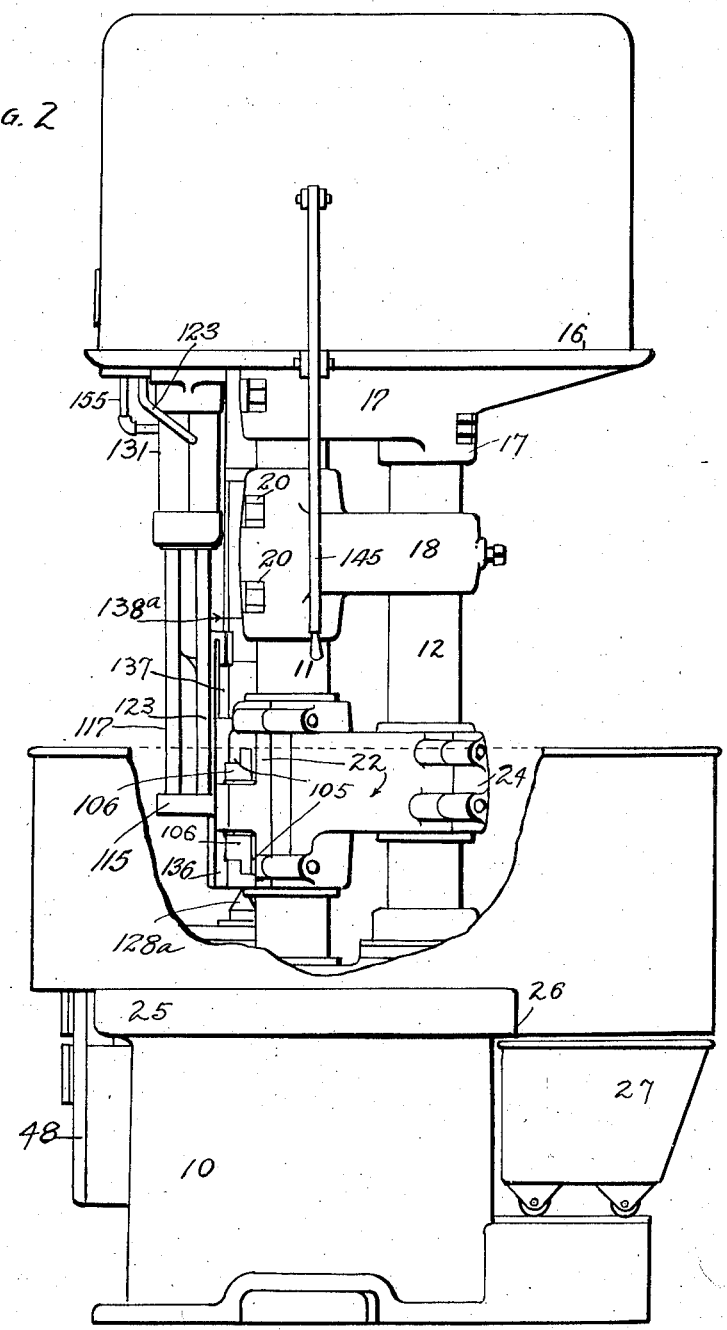

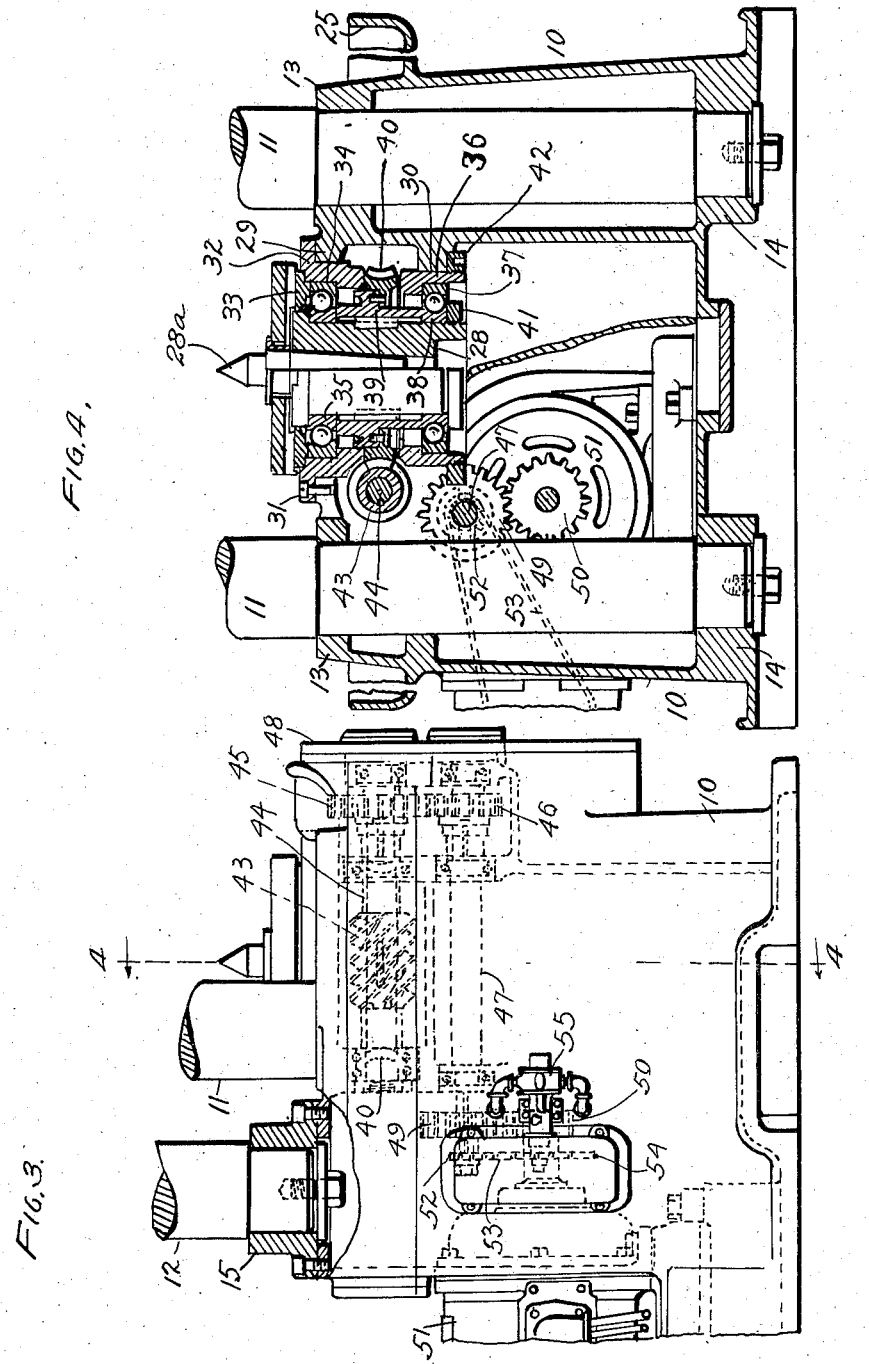

INVENTOR
Myron S. Curtis
BY Chas. J. Williamson
ATTORNEY

May 17, 1938.  M. S. CURTIS  2,118,022
MACHINE TOOL
Original Filed Feb. 9, 1931   7 Sheets-Sheet 5
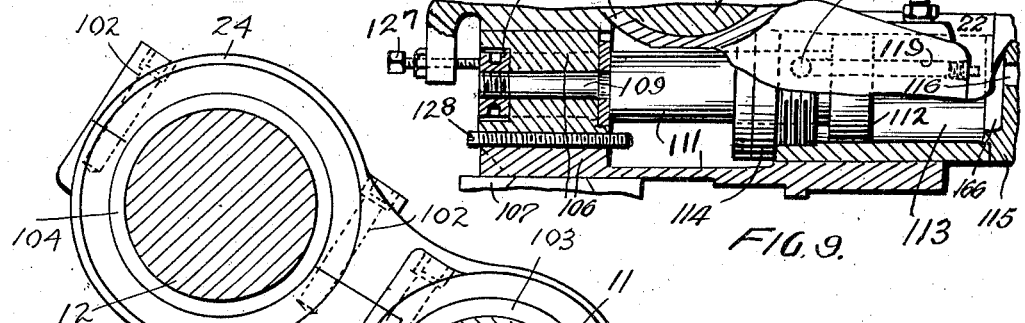
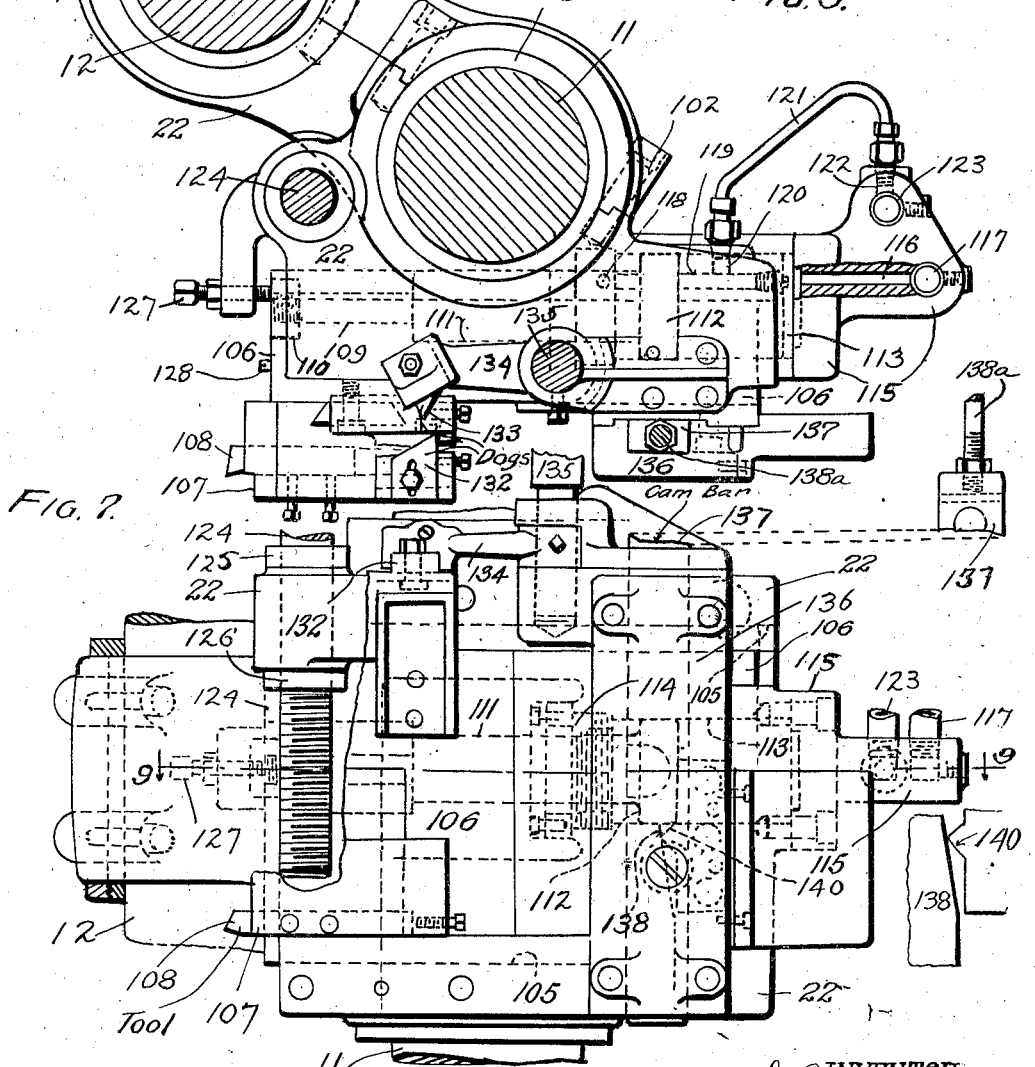

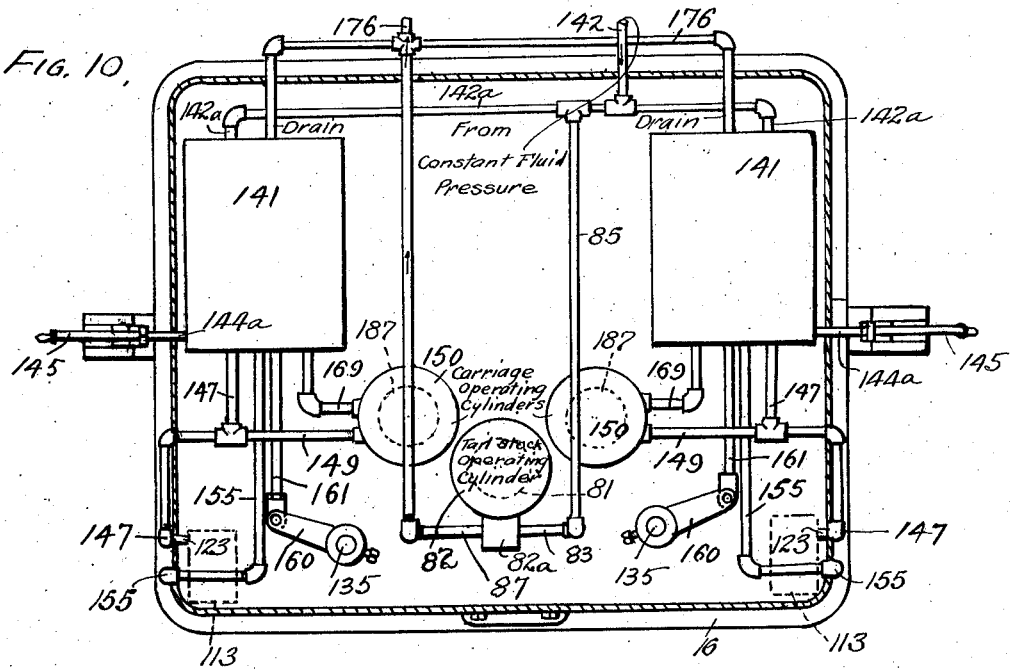
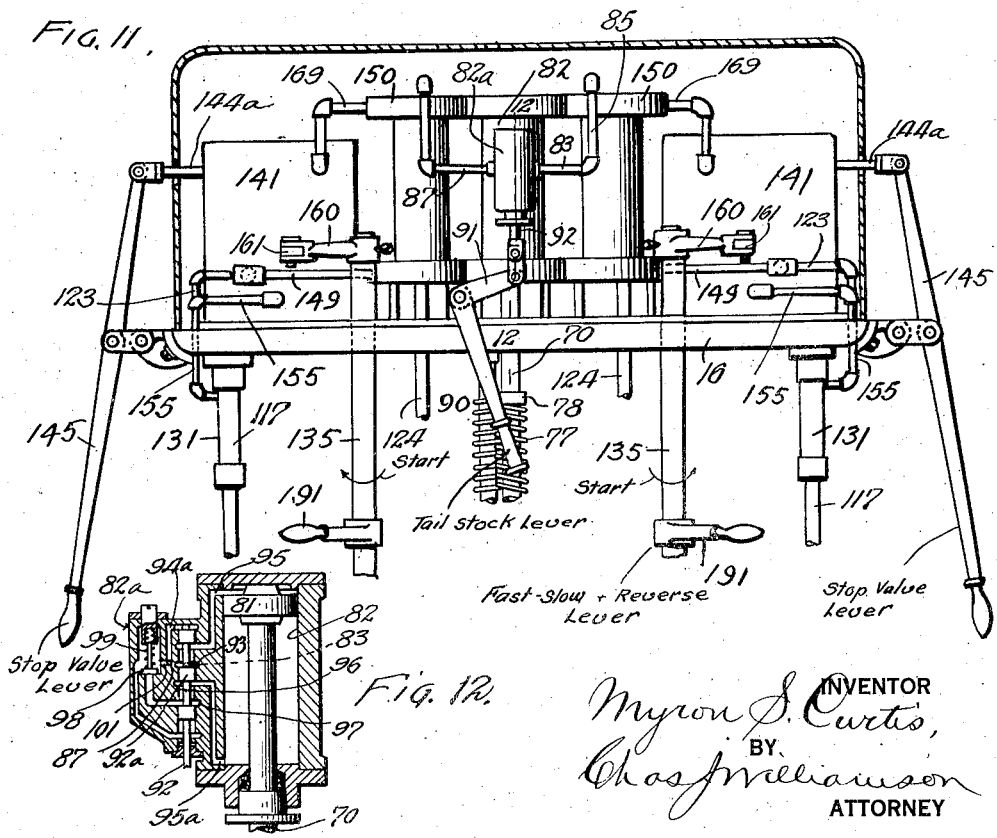

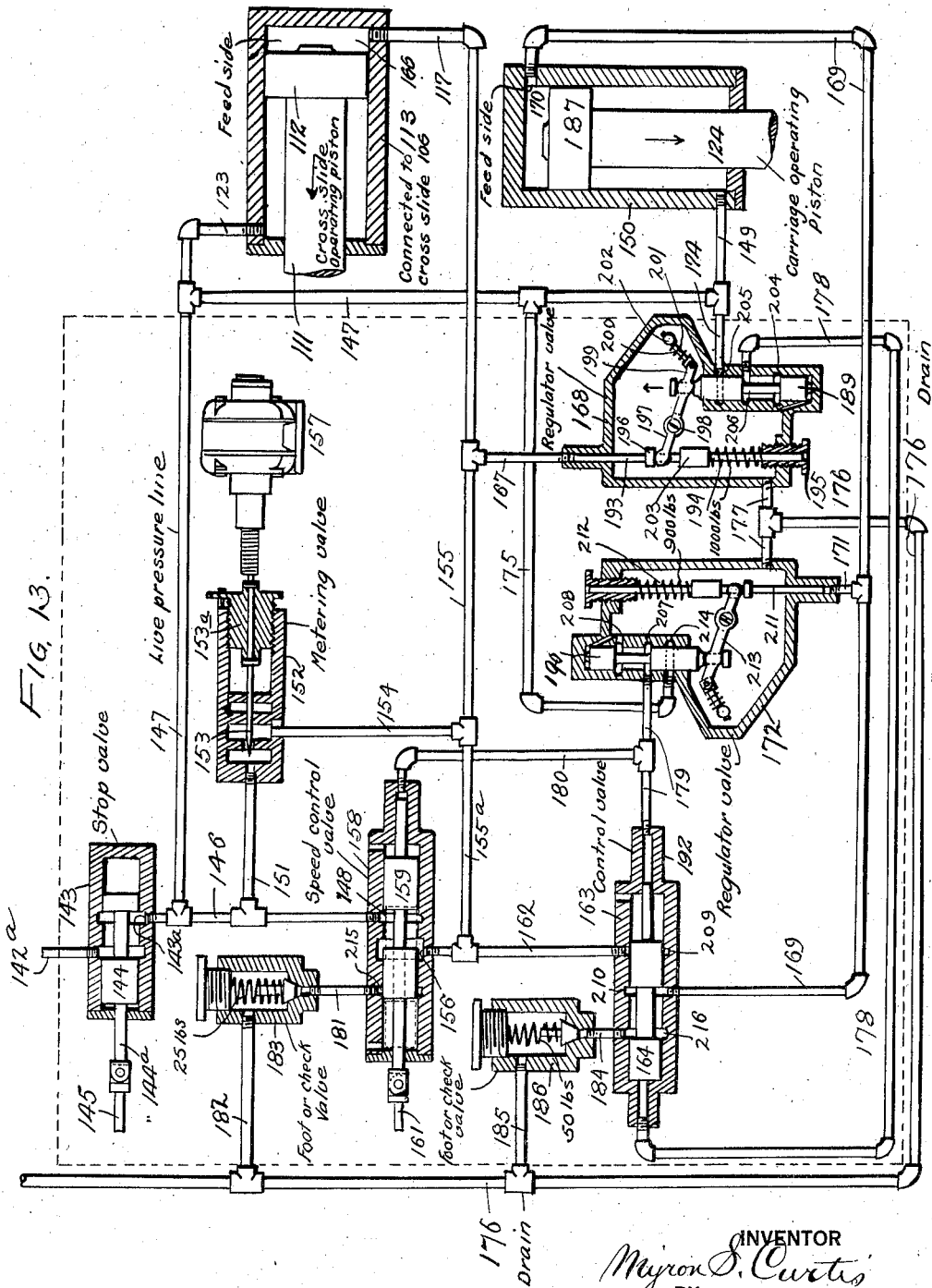

Patented May 17, 1938

2,118,022

UNITED STATES PATENT OFFICE 2,118,022

MACHINE TOOL

Myron S. Curtis, Pawtucket, R. I., assignor to William Wallace Potter, Pawtucket, R. I.

Application February 9, 1931, Serial No. 514,667
Renewed July 8, 1937

23 Claims. (Cl. 82—2)

My invention consists of improvements in machine tools for turning, boring and the like.

In my specification as an exemplification of my invention, I describe a machine for turning work on centers, but my invention is applicable to other machines, for example those in which work is held in a chuck. I do not limit myself to the center turning type of machine. Among the features of my invention and the advantages which I obtain by my improvements are:

1. Minimum of floor space and ease of operation, by virtue of the vertical construction employed;
2. Rigidity and strength of construction, and cheapness of manufacture and ease of alignment by using bars to extend between and connect the stationary members to constitute frame members and at the same time make them serve as guides or ways for the slidable machine members;
3. Ease of adaptation to a mechanical feed machine or to a hydraulic feed machine;
4. Supporting and operating a tailstock, whereby the work is more rigidly and securely held than usual; and the tailstock center is conveniently moved and clamped;
5. Construction of slides and slide base (or carriage) whereby one set of slides may be conveniently substituted for another;
6. Construction whereby the capacity of the machine may be altered by simply changing the length of the supporting bars;
7. Operation of tailstock center, by hydraulic means;
8. A construction of hydraulic feed control, whereby one or more machines may be operated from an accumulator, with minimum of parts and valves;
9. A metering valve for a hydraulic system, which gives an even flow at all degrees of opening and minimizes or obviates the effects due to wire drawing, dirt in the fluid, etc.; and
10. Novel resistance valves or regulators for operating the control valves of the hydraulic system.

My invention consists in whatever is described by or is included within the terms or scope of the appended claims.

In the drawings:—

Figure 1 is a front elevation of a machine embodying my invention, with hydraulically controlled slides;

Figure 2 is a side elevation thereof;

Figure 3 is a partial side elevation of Fig. 1, looking in the direction of the arrow in Fig. 1;

Figure 4 is a cross-section of Fig. 3, substantially on the line 4—4;

Figure 7 is a front elevation of the right hand hydraulically operated tool slide of Fig. 1;

Figure 8 is a plan view of Fig. 7;

Figure 9 is a sectional view substantially on the line 9—9 of Fig. 7;

Figure 10 is a top view of Fig. 1, with the feed plate cover removed;

Figure 11 is a front elevation of the feed plate and hydraulic cylinders of Fig. 1, with the cover removed;

Figure 12 is a sectional view of the tailstock actuating means and taken substantially on line 12—12 of Fig. 11; and Figure 13 is a diagrammatic view of the hydraulic cylinders, valves, etc., of one slide unit.

Figure 6:
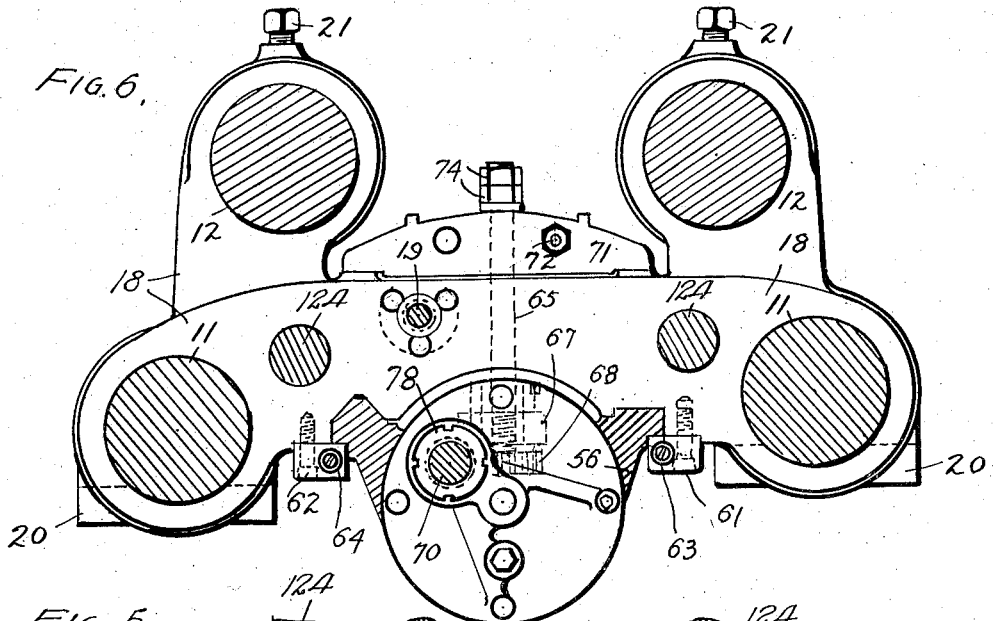
Figure 6 is a plan view of Figure 5.

The machine, as illustrated, has two units,— that is, two carriages 22, one on the right hand and the other on the left hand side of the machine, each having a tool slide 106 mounted thereon and each right and left hand carriage and its slide having its separate and necessary operating mechanisms; but, as the units are alike in construction and functions, although independent of each other, I shall describe the right hand unit only, and like numbers refer to like parts of the two units.

General construction

Base 10 has secured to and extending upward therefrom, four parallel posts or bars 11 and 12, in two pairs. Bars 11 are each firmly held in bearings 13 and 14 in bottom and top of base 10 and serve as the main support and guide bars. Bars 12 are each firmly held in bearings 15 in the top only of base 10, and serve as auxiliary supports and guides. These bars 11 and 12 extend upward to the feed plate 16, where they are firmly held and clamped by bearings 17. By employing bars of different length, the height of the machine and, therefore, its capacity may be easily altered. Preferably, the bars are round in cross-section.

Figure 5:
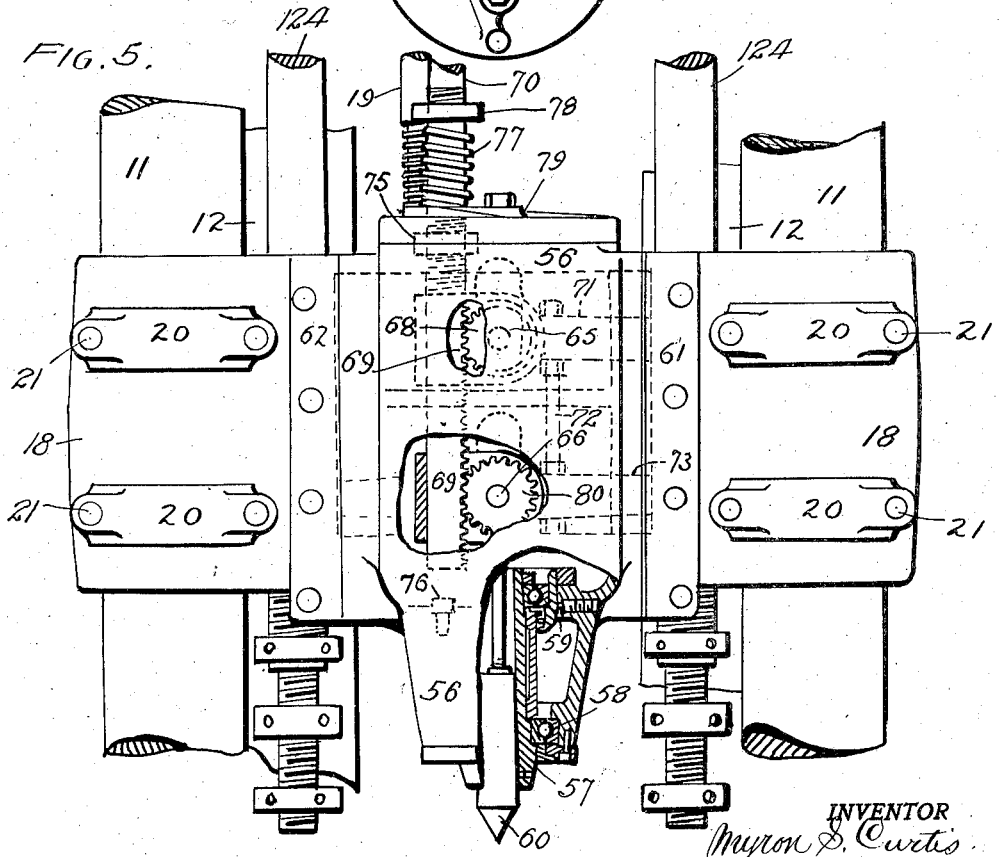
Figure 5 is a front elevation, enlarged, of the tailstock center and support.

Slidably on the bars 11 and 12 is tailstock support or carriage 18, which may be adjusted to any desired position by adjusting screw 19, (Figs. 5 and 6) one end of which is threaded into the tailstock support 18 and the other end of which is fixed in feed plate 16, and, when located in the desired position, may be securely clamped by means of caps 20, and binder screws 21. The carriages 22 (Figs. 1, 2, 7 and 8) also may be slidably mounted on each pair of bars 11 and 12, respectively. Each carriage 22 is made with a removable cap 24 (see Fig. 8) so that they may be easily and conveniently attached and removed. These are described fully hereafter.

The base 10 contains the spindle operating mechanism; the feed plate 16 supports the feed operating mechanism and the tailstock support 18 supports the tailstock 56.

*Base construction and spindle drive*

Base 10 is formed with a rim or lip 25, which forms a container for chips, the bottom of which is so sloped that the chips tend to slide down over the lip 26 into the removable chip pan 27 (Fig. 2).

Parallel with the bearings 13 and 14, and the bars 11, is a vertical spindle 28, journalled in bearings within bearing surfaces 29 and 30 (see Fig. 4). Located in the bearing surface 29, and fastened to the base 10, by screws 31, is bushing 32, in which is fixed by means of cap 33, outer bearing race 34, of an anti-friction bearing, the inner bearing race 35 of which is on the spindle 28.

Slidably but not rotatably located in bearing surface 30 is bushing 36, containing the outer race 37 of an anti-friction bearing, the inner race 38 of which is on the spindle 28.

Keyed to spindle 28 is gear spider 39 to which is fastened worm gear 40 and by nut 41, inner bearing races 34 and 38 and worm gear spider 39 are all clamped to spindle 28. The spindle 28 may be provided with any type of work-piece engaging element such as a center 28a.

Bushing 36 has screwed to its lower end a nut 42, by which the position of bushing 36 may be regulated which, in turn, regulates the amount of initial thrust placed on the spindle anti-friction bearings.

Meshing with worm gear 40 is worm 43 keyed to shaft 44 supported in bearings in the base 10 and which shaft has removably keyed to one end change gear 45 meshing with change gear 46 removably keyed to shaft 47, access to these change gears being had by means of removable plate 48, (see Figs. 3 and 4).

At the other end of shaft 47 is keyed gear 49, meshing with pinion 50 on the shaft of motor 51 and through these spindle 28 is driven by motor 51. Keyed to shaft 47 is sprocket 52, which by chain 53 and sprocket 54, drives the lubricating pump 55.

*Tailstock construction*

Slidably mounted in the tailstock support 18, is a tailstock body 56 which is bored at one end to hold the live tailstock center 60, which may be carried in a sleeve 57 rotatable in anti-friction bearings 58 and 59, but not free to move longitudinally. The sleeve 57 holds the tailstock center 60 or some other type of work supporting means. The tailstock body 56 is held to base 18 by straps 61 and 62 and adjustable gibs 63 and 64 and is bored to receive studs 65 and 66. These studs with their operating mechanism (see Figs. 5 and 6) are similar, thus only one will be described. Stud 65 is threaded on one end for engagement with a nut 67, which has fast to it a pinion 68. This pinion meshes with and is operated by rack 69 on operating rod 70. The other end of stud 65 passes through a hole in clamping plate 71 and is provided with adjusting nuts 74 for the purpose of hand adjustment. Clamping plate 71, which clamps tailstock 56 to carriage 18, is free to slide longitudinally with tailstock 56, but is held from twisting with relation to tailstock 56 by stud 72, which also serves the same purpose for the second clamping plate 73 which is operated by stud 66 and pinion 80. Rod 70 is free to slide in body 56, between collar 75 threaded to rod 70 and stop button 76, with which the end of rod 70 contacts. Spring 77, held between collar 78 on rod 70 and cap 79 on body 56, tends to hold body 56 and rod 70 in the relative position shown. Instead of the center 60, the tailstock may carry a tool or other work engaging element.

Operation is as follows: Assume the tailstock body 56 to be in the position shown which is at the top end of its stroke with nut 67 loosened by rack 69 and pinion 68. A piece of work is placed on the spindle center 28a in such a position that downward movement of the tailstock body will cause center 60 to engage a center hole in the end of the work-piece when rod 70 is moved downwards, as hereinafter described. As clamping plates 71 and 73 are now loose, body 56 is suspended by rod 70 through nut 75 and plate 79. Therefore, when rod 70 is moved downwards by means hereinafter described, the combination of the weight of body 56 and the compression of spring 77 causes body 56 to move downward carrying the center 60 against the work and bringing body 56 to rest. Further movement of the rod 70 compresses spring 77 and causes rack 69 to rotate pinions 68 and 80 which thread nuts 67 on their respective studs 65 and 66 to tighten clamping plates 71 and 73 to the tailstock support 18. Adjustment nuts 74 allow any degree of clamping tension to be obtained. When it is desired to remove the piece of work from the centers, rod 70 is moved in an upward direction, and the construction just described allows the rod 70 to move longitudinally with respect to body 56, whereby the rack 79 rotates pinions 68 and 80 in the reverse direction, thus releasing the clamps, until collar 75 is brought up against the shoulder on cap 79,—thereupon, further movement of rod 70 in an upward direction will lift tailstock body 56.

The rod 70, which operates the tailstock, has a piston 81 fixed to its upper end and slidable in cylinder 82 (see Figs. 10, 11 and 12). Cylinder 82 receives fluid either from any outside source or from pipe 142 (Fig. 10) through pipe 83 and valve casings 82a, and the exhaust from the cylinder is delivered through pipe 87 to a drain 116. Piston 81, and through it rod 70 and tailstock body 56, are controlled in movement by hand lever 90 which operates a pilot valve 92a in a valve casing 82a on cylinder 82 as follows: An extension 91 on hand lever 90 is connected with valve rod 92 so that movement of the hand lever reciprocates the valve rod 92 and the pilot valve 92a. With the valve 92a in the upper position shown, fluid enters the valve casing through pipe 83 and port 93 and passes to port 94 which is connected by port 95 with the upper end of the cylinder 82 and acts on piston 81 to force it down. The fluid on the underside of piston 81 is forced out through port 95a to port 96, where it passes by the valve to port 97, and lifting poppet valve 98 against the pressure of adjustable spring 99, escapes into exhaust port 87 through port 101.

When valve rod 92 is pulled down by means of hand lever 90, fluid enters through port 93, passes to port 96 and thence to the underside of piston 81 by means of port 95a, the fluid on top of piston 81 being displaced through ports 95, 94, and passage 94a to exhaust pipe 87.

It will be noted that in the upward movement of piston 81, the exhaust flows freely to pipe 87, whereas in its downward movement it is necessary for the exhaust to lift poppet valve 98. The reason for this is three-fold: First, if the fluid were free to exhaust from the under side of the piston when the pressure was shut off from the pipe 83 for any reason, the weight of the tailstock body would cause the tailstock and p'ston to drop; spring 99 is therefore loaded sufficiently to cause valve 98 to maintain a sufficient back pressure against piston 81 to hold the tailstock up when there is no pressure in the line 83. Second, if there were no back pressure on the under side of the piston, immediately that pressure was applied to the top of the piston, the tailstock body would drop rapidly and out of control. Third, it is desirable to have more force available to retract the tailstock center than to advance it. Due to the area of the piston rod 70 there is more working area on piston 81 to push it down than to push it up. I remedy this difficulty, by applying a back pressure to the bottom side of piston 81 by means of spring controlled poppet valve 98, so that there is extra back pressure on the bottom of the piston when the piston is being forced down.

Hydraulic slide construction

The construction of the hydraulic carriage and slide are best shown on Figs. 7, 8 and 9, which show the right hand carriage and slide of Fig. 1.

The carriage or slide base 22, as before explained, has a cap 24 bolted to it by bolts 102 so that when bolted together the two form a unitary base. This is bored out to hold bushings 103 and 104 which slidably fit on bars 11 and 12, respectively.

Carriage 22 is provided with ways 105 (Figs. 2 and 7) in which is slidably mounted slide 106 fixed to which is tool block 107 holding tool 108, or some such arrangement for cutting work. Securely fastened in slide 106 by stem 109 and nut 110 is rod 111, one end of which forms piston 112 which slides in cylinder 113, which is a part of carriage 22. One end of the cylinder is closed by gland 114, and the other end by cap 115. Fluid reaches the outer side of the piston 112 through port 116 and pipe 117, and reaches the inner side of the piston through ports 118, 119 and 120, which are drilled in carriage 22, pipe 121, port 122, which are in cap 115, and p'pe 123, so that by applying pressure on one side or the other of piston 122, the piston may be moved in the cylinder and cause the slide 106 to traverse either inward or outward on guideways 115 on carriage 22.

Carriage 22 is movable vertically by push rod 124, the lower end of which is threaded and securely but adjustably held in carriage 22 by collars 125 and 126. The operation of rod 124 and control of the flow of fluid to the cylinder 113 is hereinafter described. The slide 106 is stopped at the end of its inward movement by adjustable stop screw 127, and at the end of its return stroke by adjustable stop screw 128 engaging with gland 114 (see Fig. 9), and carriage 22 is stopped at the end of its downward stroke by adjustable stop screw 129 (see Fig. 1) on the base 10 and is limited in its upward movement by adjustable screw 130 on tailstock support 18. As carriage 22 moves up and down pipes 117 and 123 which are carried by the cylinder cap 115 on said carriage, slide up and down in trombone 131. Adjustably bolted to slide 106 is dog 132 which coacts with finger 133 on lever 134 to cause partial rotation of shaft or rod 135, which shaft controls the change from fast ahead to feed ahead in a way hereinafter described.

It is sometimes desirable to have the cutting tool 108 follow an angular or curved path; this is accomplished by moving slide 106 either in or out at the same time that carriage 22 is moving upwards or downwards. For that purpose, securely fastened to the carriage 22 is housing 136 (see Figs. 1, 7 and 8), in which is slidably mounted cam bar 137 on which is formed cam 138. The upper end of cam bar 137 is fastened by rod 138a to feed plate 16, so that it is held stationary and, therefore, as carriage 22 moves either up or down, cam bar 137 and thus cam 138 is moved relatively to it. Fastened to the rear or outer end of slide 106 and co-acting with cam 138 is follower block 140. At the beginning of a cycle slide 106 will be pushed in by fluid pressure entering cylinder 113 through pipe 116 and acting against the outside of piston 112 until cam follower 140 touches cam 138. Longitudinal movement of carriage 22 will now cause relative movement of cam 138 and follower 140 and the fluid pressure will cause follower 140 and, therefore, slide 106 to follow the contour of the cam. In order to avoid tool marks on the work upon the return of the tool, fluid pressure is applied to the inner side of the piston 112 from pipe 123 through port 118 before carriage 22 starts on its return movement, thus causing the slide 106 to be pulled away from the work and cam follower 140 to be pulled away from the cam 138.

Hydraulic slide operation and control

Hydraulic control of the slides is illustrated in Figs. 10, 11 and 13: Fig. 13 being a diagrammatic view of the piping, cylinders, and valves, most of which are contained in one housing 141, there being one housing 141 and associated parts for each carriage unit as shown in Figs. 10 and 11. Since the control and operation of each carriage unit is the same, only one will be described.

Pipe 142 leads from an accumulator, or source of fluid supply, from which the fluid may be drawn in varying volume but under constant head, and is connected by pipes 142a with the stop valve casing 143 (Figs. 10 and 13) one in each housing 141. A slidable stop valve 144 is in each valve casing 143 and each valve 144 is controlled by a lever 145 (Figs. 1, 2, 10, 11 and 13), in such a way, that when the valve 144 is in the position shown, fluid from the source 142 is free to flow through the valve casing 143 and, when moved to its other extreme position, the fluid source is completely shut off from the hydraulic system. From delivery port 143a valve body 143 leads pipe 146 which supplies fluid pressure through various instrumentalities to the carriage cylinder 150 and cross-slide cylinder 113 to advance the carriage 22 and/or slide 106 quickly to the work-piece in idle movements and slowly for work-performing or cutting operations. From the delivery 143a of valve-body 143 leads a pipe 147 which supplies fluid pressure to reverse of the cylinders 150 and 113.

From pipe 147 leads pipe 123 to the inner or reverse side of cross-slide cylinder 113, and from it also leads pipe 149 connected to the lower end or reverse side of carriage operating cylinder 150. Thus, when valve 144 is open, there is always full pressure on the return side of both the cross slide and the carriage operating pistons 112 and 187 to hold them in retracted position. A branch pipe 151 leads from pipe 146 to metering valve 152 having a needle valve 153 (the amount of opening of which is regulated by a threaded bushing or sleeve 153a) which is connected by pipe 154 to pipe 155 to the outer or forward side of cross-slide cylinder 113 by pipe 117. Needle valve 153, when the machine is in operation, is constantly revolved by motor 157. This rotation of the needle valve is a feature of my invention as by this means a very small opening can be maintained without the evil effects of wire drawing and stoppage due to minute particles of foreign matter in the fluid blocking up the port.

The main pipe 146 from stop valve 143 leads to valve body 158 in which is a double valve 159 connected to and controlled by the rotatable shaft 135 through lever 160 and link 161 (Figs. 1, 7, 8, 10, 11 and 13) and which valve controls the fast and slow feed and the reverse, in a manner hereinafter described. Leading from a mid-port 156 in the valve body 158 is pipe 162, connected with valve body 163, having valve 164 therein operated in a manner hereinafter described and which controls the operation of the carriage 22. Pipe 154 from the metering valve 152 has a branch 155a connected to the pipe 162 which connects valves 158 and 163. Also a branch pipe 167 connects regulator 168 with the pressure line between the stop valve 143 and the cross-slide cylinder 113, preferably being connected to pipe 155. Issuing from valve body 163 is pipe 169 which connects with the feed side 170 of the carriage cylinder 150, and a branch 171 from pipe 169 connects with regulator 172, similarly as does pipe 167 with regulator 168.

These regulators (or resistance valves, as they may be called) 168 and 172 are responsive to fluid pressure in the system to selectively direct said fluid pressure to actuate the piston valves 159 and 164 which control the movement and speed of carriages 22 and cross-slides 106. These regulators 168 and 172 are identical in construction and have pilot valves 189 and 190, respectively, which control non-metered fluid pressure from pipe 147 through branches 174 and 175, respectively, and are each connected with a drain pipe 176 through branch pipes 177. Pilot valve 189 of regulator 168 is also connected with one end of valve 163 through pipe 178, while pilot valve 190 of regulator 172 is similarly connected with the other end of control valve 163 through pipe 179 and is also connected with one end of control valve 158 through pipes 179 and branch pipe 180, the other end of control valve 158 being connected to hand lever 191 through link 161.

One port of valve 158 is connected to drain pipe 176 by pipes 181 and 182 having foot or check valve 183 interposed therein, which is set to maintain in the machine shown, a back pressure of twenty-five pounds, while one port of valve 163 is connected with drain pipe 176 by pipes 184 and 185 having foot or check valve 186 interposed therein which is set to maintain a back pressure of fifty pounds, in the machine shown.

The cycle of hydraulic operations is as follows (the operation of the right hand slide only being described):—

In following through the cycle of operations of this system, it is to be remembered that the arrangement is such that fluid is taken from an accumulator of constant pressure (for example: 1100 pounds per square inch) and that all pipes which connect with the accumulator will maintain this pressure as long as the fluid is static. When, however, the pistons start to move, thus allowing the fluid to flow, the pressure in the pipes connected with the cylinders will be just enough to overcome the resistance of the pistons and tool slides (the maximum of which is about 500 to 600 pounds per square inch). Immediately that the tool slides are positively stopped, however, pressure will build up to the maximum unless relieved.

At the beginning of a cycle, the carriage 22 is at its extreme upward position and the cross-slide 106 in its extreme outward position, away from the work, with pistons 112 and 187 in the positions shown in Fig. 13. Piston 159 of valve 158 is in its extreme left hand position, as shown in dotted lines, and piston 164 of valve 163 is also in its extreme left hand position. With the valves 158 and 164 in these positions, the fluid flows under pressure through stop valve 143, pipe 147 and pipe 123 to the reverse side of piston 112, and through pipes 147 and 149 to the reverse side of piston 187.

As valve piston 159 is in the extreme left position covering port 148 further progress of the fluid under pressure in this direction is impossible. A certain amount of fluid proceeds through pipe 151 and valve 153 to pipe 154, thence through pipes 155a, 162 to port 156 of valve 158, said port being positioned to be opened and closed by one portion of the valve plunger 159. As valve plunger 159 is in the extreme left hand position fluid pressure passes from port 156 to port 215, thence through pipe 181, foot valve 183 and pipe 182 to drain 176. In a similar way, the fluid from the outer side of piston 112, escapes through pipes 117, 155, 155a, 162 and ports 156 and 215 to pipe 181, foot valve 183, pipe 182 to drain 176. The fluid from the advance or upper side 170 of piston 187 flows through pipe 169 to ports 210 and 216 of valve 163 to pipe 184, foot valve 186 and pipe 185, to drain pipe 176. At the same time high pressure fluid from pipe 147 is also passing from pipe 174 to port 205 of the regulator 168, but as the pilot valve 189 of said regulator is in the position shown covering port 205, no further movement of the fluid in this direction is possible. In the same way, a portion of the high pressure fluid flows from pipe 147 through pipe 175 to port 214 of regulator 172 where it is similarly blocked by pilot valve 190 which is in the position shown covering port 214. Therefore, high pressure is on the reverse side of pistons 112 and 187 and the advance sides of these pistons are open to the drain; thus both slides are held in their extreme retracted positions.

A cycle of operation is started by the operator, who, by means of hand lever 191 (in the direction of the arrow shown in Fig. 11) which is attached to control rod 135, operates rod 161 and throws valve plunger 159 into its extreme right position as shown by full lines in Fig. 13. The high pressure fluid is now able to proceed from pipe 146 through port 148 of valve 158 to port 156, pipes 162, 155a, 155 and 117 to the outer or forward side 166 of cylinder 113. The same pressure is now on both sides of the cross-slide operating piston 112, but due to the diameter of the piston rod 111 the total pressure (or differential pressure) is greater on the forward side of the piston and the piston and rod move rapidly in the direction shown by the arrow, thus feeding the cross-slide in rapidly. As the cross-slide approaches the work, the adjustable dog 132, Figs. 1, 8 and 9, is set so as to act on finger 133 of lever 134 fast on shaft 135, thus rocking shaft 135 to an extent (opposite to that movement previously imparted to it by handle 191), moves plunger 159 into middle position so as to cut off port 148 and also port 215, thus preventing further flow of high pressure fluid through valve 158 to cylinder 113.

Nevertheless, a metered amount of high pressure fluid, flows to the forward end 166 of cylinder 113 from a pipe 146 through pipe 151, metering valve 152, pipes 154, 155 and 117, the rate of this flow being determined by the amount which needle valve 153 is opened by adjusting bushing 153a, thus the piston 112 continues to advance slowly for cutting operations. During this operation it is to be understood, as explained above, that the valve member 159 closes port 148, thus preventing constant pressure in large volume from being transmitted to the cylinder 113. During this slow advancing movement for cutting operations of the piston 112, the reverse side of the piston 112 is acting against constant pressure being introduced at the reverse side of the cylinder 113 through pipes 147 and 123, but due to the area of the piston rod 111 the effective pressure on the reverse side of the piston is less than on the forward feeding side and the piston advances.

When the cross slide 106 reaches the end of its stroke, it abuts against stop screw 127 (Figs. 8, 9, 10) in carriage 22, which prevents further forward movement. Pressure then immediately begins to build up in the high pressure line 117, 155, branch pipe 167 of regulating valve 168 and tends to move valve plunger 193 against the resistance of spring 194 which is adjusted by threaded bushing 195, to resist pressure of 1000 pounds per square inch. When pressure is high enough to overcome the resistance of this spring, plunger 193 is moved, and by shoulder 196 thereon, lever 197 pivoted on pin 198, starts to move valve plunger 189 in the direction shown by the arrow. This movement is relatively slow until jaws 199 on lever 197 get over the center, when it is snapped quickly the rest of the way by means of spring 200 on rod 201 pivoted on pin 202. This quick movement is allowed by the extra space between shoulders 196 and 203 on plunger 193. As piston 189 is slowly moved in the direction of the arrow, port 204 which is first covered by piston 189, is not uncovered until the quick snap takes place and valve piston 189 is thrown to its extreme position. When this occurs, port 205 is uncovered and put into communication with port 206 and the high pressure fluid flows from pipes 147, 174 to pipe 178 to the left hand end of valve 163 where it causes valve piston 164 to move quickly to its extreme right position, the fluid in the chamber 192 on the right hand end of valve piston 164 escaping through pipe 179, port 207 of regulating valve 172 thence to port 208, where it drains into the body of valve 172, and from thence out through pipe 177 to the drain pipe 176. Throwing valve plunger 164 to the right puts port 209 in communication with port 210 and allows the fluid to flow from metering valve 152 through pipes 154, 155a, 162, valve 163 through pipe 169 to the advance side 170 of piston 187 causing it, by means of the beforementioned differential pressure, to feed the carriage 22 slowly downward, the rate of feed depending, as before, on the amount of opening of needle valve 153. As soon as piston 187 starts to move downward, the pressure in line 167 accumulated by the stopping of piston 112, drops below that necessary to move plunger 193 and spring 194 causes plunger 193 to move back to its original position as shown in Fig. 13, this action also reseating valve 189 in the position shown in Fig. 13. The same quick snap of lever 197 takes place on this reseating, as on the original movement of the valve.

The play, between the end of lever 197 and collars 196 and 203 on plunger 193 is necessary because if there was no play, as pressure built up in line 167 sufficient to overcome the pressure of spring 194, plunger 193 would move, and by lever 197 move valve plunger 189 in the direction of the arrow. As soon as this valve plunger had moved sufficiently to connect ports 205 and 206 fluid would immediately start to flow through pipe 178 to the end of valve 164, moving it to the right. Immediately port 209 was allowed to communicate with port 210, pressure in line 167 would drop and plunger 193 would immediately be started back by spring 194, thus moving valve plunger 189 to close port 205. This operation might take place before the fluid had a chance to move plunger 164 to its extreme right position, and such action would be detrimental. The extra play between the end of lever 197 and the collars on plunger 193 and the quick snap caused by spring 200 to lever 197 after it has crossed the center, provide a sufficient dwell or delay to plunger 189 to allow the operations to be completely carried out.

Since the valve 164 is in its extreme right hand position, communicating ports 209 and 210 and valve 159 is in its mid position closing ports 148 and 215, metered fluid pressure flows from pipe 154 through pipe 169 to continue the movement of carriage 22 downwardly until the carriage comes in contact with stop screw 129 (Fig. 1) when movement stops. Since the downward movement of the piston 187 has been arrested by the stop 129, pressure on the upward or forward side of the piston 187 builds up in the high pressure line now consisting of pipes 169, 155a, 155 and 167 connected with plunger 193 of regulator valve 168, (the same as previously described in connection with cylinder 113 for the purpose of moving plunger 193 against the tension of spring 194 set for 1000 pounds of pressure per square inch), but as pipe 169 is also connected with plunger 211 of regulator valve 172 by pipe 171 this build-up pressure will first actuate plunger 211 against the tension of spring 212 set at a lower pressure than spring 194, say for instance 900 pounds to the square inch. When the pressure reaches 900 pounds per square inch plunger 211 starts to move, and throws pilot valve 190 by means of lever 213, (in the same way as that hereinbefore described in connection with valve 189) thus connecting port 214 with port 207 and allowing the high pressure fluid from the live pressure line 147, to pass through pipe 175, ports 214 and 207 and pipe 179 to the right hand side of valve piston 164 throwing it to its extreme left position, shown in the drawings, the fluid from the left hand side of valve piston 164 escaping through pipe 178, port 206, port 204 to the interior of valve casing 168, from whence it escapes to the drain through pipes 177 and 176. At the same time this high pressure also passes from regulating valve 172 through pipes 179 and 180 to the right hand end of valve piston 159, throwing it to its extreme left position shown in dotted lines. The advance side 166 of cross slide cylinder 113 is now connected with the drain pipe 176 through pipes 117, 155, 155a, 162, ports 156.

and 215 to pipe 181, foot valve 183 and pipe 182, and the advance side 170 of piston 187 is now connected with the drain 176 through pipe 169, port 210, port 216, pipe 184, foot valve 186 and pipe 185; and as there is always present high pressure on the reverse side of pistons 112 and 187 from the live pressure line 147 they tend to be pushed back. Foot valve 186 is set to resist a higher pressure than foot valve 183. For example, 186 may be set at fifty pounds per square inch and 183 at twenty-five pounds per square inch. Therefore, due to the peculiarities of flow of liquid from an accumulator, the extra back pressure on valve 186 will keep piston 187 from starting its reverse movement until piston 112 has reached its extreme outer or retracted position. Then piston 187 will start back until it reaches its extreme retracted or upper position.

As soon as valve plunger 164 has been shifted to its extreme left position, as hereinbefore mentioned, the pressure in line 169 will drop as hereinbefore mentioned and plunger 211 and pilot valve 190 of regulator 172 will be reset by spring 212 in the same manner in which valve 189 of regulator 168 was reset.

The pistons and valves and slides are now in their original position, ready to start another cycle upon operation of plunger valve 159 by hand lever 191.

If, at any time, it is desired to stop or start the machine during a cycle, that can be done through stop valve 144 by means of hand lever 145 (Figs. 1, 10, 11 and 13). In the cycle of operation, as above described, the valve piston 159 is shifted from the fast ahead position shown in full lines of Fig. 13, to the slow feed ahead position (a middle position of the valve to close ports 148 and 215) during the forward movement of the cross slide 106, but it is evident that the throwing of this valve into the slow feed position may be deferred until any point in the forward cycle of either the cross slide or the carriage, or it may not be shifted to the feed position at all, in which case the complete cycle will take place on the fast motion. It is also contemplated and within the purview of this invention that the carriage 22 (or its like counter-part) may be actuated before the slide 106 in the beginning of the machine operating cycle.

That which is claimed is:

1. In a fluid pressure mechanism for machine-tools having a movable member whose rate of movement in one direction is to be changed, a source of constant fluid pressure to effect all such rates of movements, a pressure receiving element connected with said movable member, means for establishing fluid pressure connection between said pressure source and the fluid pressure receiving element, a valve means in said connection means for changing the rate of movement of the movable member and including a valve element for varying the amount of fluid delivered to the pressure receiving element from said supply source, and a second valve element for controlling the delivery of larger volume to said pressure receiving element from said source whereby the rate of movement of said member may be changed.

2. In a fluid pressure mechanism as in claim 1 said valve means including means for relieving the pressures on said pressure receiving element, and means for moving said member in reverse direction when said pressures are relieved.

3. In a mechanism as in claim 1 in which the pressure receiving element is the piston of a hydraulic cylinder and there is a second movable member likewise operatively connected with the piston of another hydraulic cylinder, and in which the fluid connection means extends between said valve means and both of said cylinders and means for automatically controlling the flow of said fluid through said connections for obtaining a sequential operation of said members.

4. In a fluid pressure mechanism for machine-tools as set forth in claim 1 wherein said valve means includes means for relieving the said pressures on said pressure-receiving element and wherein there is fluid passage means supplying a constant pressure to the pressure-receiving element to move and retain said member in a retracted position and to yieldingly resist the movement of the member in the other direction.

5. A fluid pressure mechanism for operating a single moving member, or a plurality of moving members, comprising a constant pressure source of fluid supply; member moving means whereby pressure may be exerted on such means to advance or retract a member, aforesaid; a constantly open connection between the constant pressure source of fluid supply and the retraction side of the member-moving means; means for connecting the advance side of the member-moving means with either a drain line, a source of fluid under constant pressure in large volume, or a source of fluid under constant pressure in small volume; means for metering the constant pressure fluid supply, means for producing back pressure in the drain line, and a quick-acting means operated by variation in pressure to automatically change the fluid flow.

6. In a fluid pressure mechanism for machine-tools having a fluid metering needle valve, and means to rotate said valve while the mechanism is in operation.

7. In a fluid pressure mechanism for machine-tools that have to and fro moving members, a quick action valve that controls the fluid pressure acting on such a member, automatic means to operate said valve comprising a fluid pressure moved plunger, means yieldingly opposing movement of said plunger by fluid pressure, and an operative connection between the plunger and said valve acting by movement of the plunger under fluid pressure in excess of the yieldable movement opposing means.

8. A fluid pressure mechanism for a machine-tool that has a plurality of to and fro moving slides, a hydraulic cylinder and piston operatively connected with each slide, a source of supply of fluid pressure, piping leading from such source to each of said cylinders, a valve in such piping for controlling fluid pressure delivered to said cylinders, a second valve means in said piping adapted to cause fast and slow movements to the slides and to reverse the direction thereof, a resistance valve in said piping for each hydraulic cylinder and subject to pressure supplied to the respective cylinders, and means to prevent action of each such resistance valve until a predetermined fluid pressure is applied thereto.

9. In a machine-tool having movable carriage, a slide on said carriage having a follower block, a housing on said carriage, a former cam; a bar carrying the cam and slidable in said housing, hydraulic means for placing the slide follower block in contact with the former cam holding it there and retracting it; and means for imparting relative movement to slide and former cam.

10. A machine-tool comprising two spaced apart units, a lower unit constituting an upright base, means mounted on such base for imparting rotation to the work and including a vertical spindle; the other unit being an upper unit supporting tool-feed mechanism and including a horizontal bottom feed-works supporting plate, a plurality of vertical bars rigidly supported at their lower ends in the lower unit and extending upward to the underside of said plate and rigidly connected to said plate, tool slides mounted to reciprocate on said bars, and operative connections between the feed-works above said plate and said slides reaching downward from said plate.

11. A machine-tool comprising two spaced apart units, a lower unit constituting an upright base, means mounted on the base for imparting rotation to the work and including a vertical spindle; the other unit being an upper unit supporting tool feed mechanism and including a horizontal bottom feed work supporting plate, a plurality of vertical bars rigidly supported at their lower ends in the lower unit and extending upward to the underside of said plate and rigidly connected to said plate, tool slides mounted to reciprocate on said bars, and operative connections between the feed works above said plate and said slides reaching downward from said plate, said operative connections comprising members of hydraulic mechanism situated above said plate.

12. In a machine-tool, a plurality of members adapted to cooperate with respect to a work piece in the machine, means for moving one of said members to and from the work piece, means for locking said member in one of its movements and comprising a clamp means, said member moving means having a loose connection with said member whereby said member moving means may continue movement after the movement of said member has been arrested in one direction and will first move in the opposite direction before correspondingly moving said member, said member moving means having an operable connection with said clamping means to operate the same for clamping said member when it has been arrested in its movement in one direction and for releasing said clamping means when initially moved in the opposite direction.

13. In a machine-tool as set forth in claim 11 further characterized by said member moving means including a fluid pressure actuating device for operating said moving means in opposite directions, and means for gradually releasing back pressure in said device in the movement of said member toward the work piece in the machine.

14. In a machine-tool as set forth in claim 11 further characterized by said member moving means including a fluid pressure actuating device for operating said moving means in opposite directions, means supplying fluid pressure to said fluid pressure actuating device and normally maintaining said pressure thereto from moving said member away from the work-piece, and means for gradually releasing back pressure in said device in the movement of said member toward the work piece in the machine.

15. In a machine-tool, a plurality of members adapted to cooperate with respect to a work piece in the machine, means for moving one of said members to and from the work-piece, said member having a work engaging part, a support for said member with respect to which it moves, a clamping element positioned to engage and bind against said support, means connecting said clamping element and said member and operable to bind said element against said support and to release the same and including a rotatable rod, said member moving means having a yielding slidable connection with said member so that when the member is arrested in its movement to engage the work-piece said moving means will have a further continued movement, and an operative connection between said moving means and said rotatable rod, whereby the clamping element will be actuated after said member has been brought to rest in its engagement with the work-piece and will be again actuated when the moving means is initially operated to withdraw said member from the work-piece, but before said member is actually moved.

16. In a machine-tool, a plurality of members adapted to cooperate with respect to a work-piece in the machine, means for moving one of said members vertically to and from the work-piece, said member having a work engaging part, a support for said member with respect to which it moves, a clamping element positioned to engage and bind against said support, means connecting said clamping element and said member and operable to bind said element against said support and to release the same and including a rotatable rod, said member moving means having a loose slidable connection with said member so that when the member is arrested in its downward movement by engagement with the work-piece said moving means will have a further downward movement, and an operative connection between said moving means and said rotatable rod, whereby the clamping element will be actuated after said member has been brought to rest in its downward movement and will be again actuated when the moving means initially operated to raise said member, but before said member is actually moved.

17. In a fluid pressure mechanism for a machine-tool which has a to and fro moving member; a hydraulic cylinder and a piston therein operatively connected with said member for moving the latter in two directions, a source of constant pressure supply having a constantly open connection with said cylinder for moving said piston into and maintaining the same in a position to retract said member, another connection between said source of supply and said cylinder to operate said piston to feed the member forwardly, means in said second connection for controlling the flow of fluid pressure to said cylinder at the member advancing side of said piston, and means in said second connection and responsive to back pressure for actuating said first mentioned means to relieve the pressure on the advance side of said piston, whereby the pressure on the retraction side of said piston will operate the same.

18. In a fluid pressure mechanism for a machine-tool which has a to and fro moving member, a hydraulic cylinder and a piston therein operatively connected with said member for moving the latter in two directions, a source of constant pressure supply having a constantly open connection with said cylinder for moving said piston into and maintaining the same in a position to retract said member, another connection between said source of supply and said cylinder to operate said piston to feed the member forwardly, said second connection including means for controlling and varying the fluid pressure delivered to the advance side of said piston whereby the rate of advanced movement of said piston may be varied, and means in said second connection and responsive to back pressure for actuating said first mentioned means to relieve the pressure on the advance side of said piston, whereby the pressure on the retraction side of said piston will operate the same.

19. In a fluid pressure mechanism for a machine-tool which has two to and fro moving members; two hydraulic cylinders and pistons, one for each of said members to operate the same; a source of constant pressure supply having a connection with the cylinders at the retraction side of each of said pistons for moving said pistons into and maintaining the same in positions to retract said members, another connection between said source of supply and said cylinders at the advance side of their respective pistons, a valve means in said second connection operable to deliver sufficient pressure to one of said pistons to advance the latter from its retracted position, means responsive to back pressure in the advance pressure line of said last mentioned piston to operate said valve means for admitting pressure to the advance side of the other of said pistons, and another means responsive to pressure in the advance pressure line of said other piston for operating said valve means to cut off the advancing pressure to each of said cylinders whereby the constant pressure at the retraction sides of said pistons will become effective for retracting the same.

20. In a fluid pressure mechanism for a machine-tool as set forth in claim 19, further characterized by other pressure responsive means in said connections responsive to the said back pressure in said advance side of said cylinders for allowing one of said pistons to be retracted before the other of said pistons.

21. In a fluid pressure mechanism for operating a moving member or a plurality of moving members of a machine tool, which mechanism comprises a source of constant pressure fluid supply, means for moving said member by said fluid pressure to advance said member or retract the same, a constantly open connection between said pressure supply source and the retraction side of said member moving means, means for connecting the advance side of said member moving means with said pressure supply source and to a drain, and valve means in said last mentioned connecting means for controlling the pressure therein to said member moving means, and means in said advance side connection and by-passing said valve means for metering the constant pressure supply from said source to the advance side of said member moving means.

22. In a fluid pressure mechanism as set forth in claim 21 further characterized by means for producing a back pressure in said advance side connecting means, and a pressure device responsive to variations in the pressure in said advance side connecting means for automatically relieving the pressure therein when predetermined pressure has been reached.

23. In a fluid pressure mechanism as set forth in claim 21 further characterized by a second to and fro movable member and means for operating said member, an open connection between the said source of fluid pressure and said last mentioned member moving means for retracting said second member; another connection between said last mentioned member moving means, the outlet side of said first mentioned valve means and the outlet side of said metered pressure connection for advancing said second member, and a second valve means in the advance side connection of said last mentioned member moving means for opening and closing the same, means in the advance side connections and responsive to pressure therein from the member moving means, a connection between said pressure responsive means and said second valve means to effect the advancing operation of said second member, and a connection between said pressure responsive means and both of said valve means for rendering the pressure in said member advancing connections ineffective.

MYRON S. CURTIS.